Patented July 7, 1931

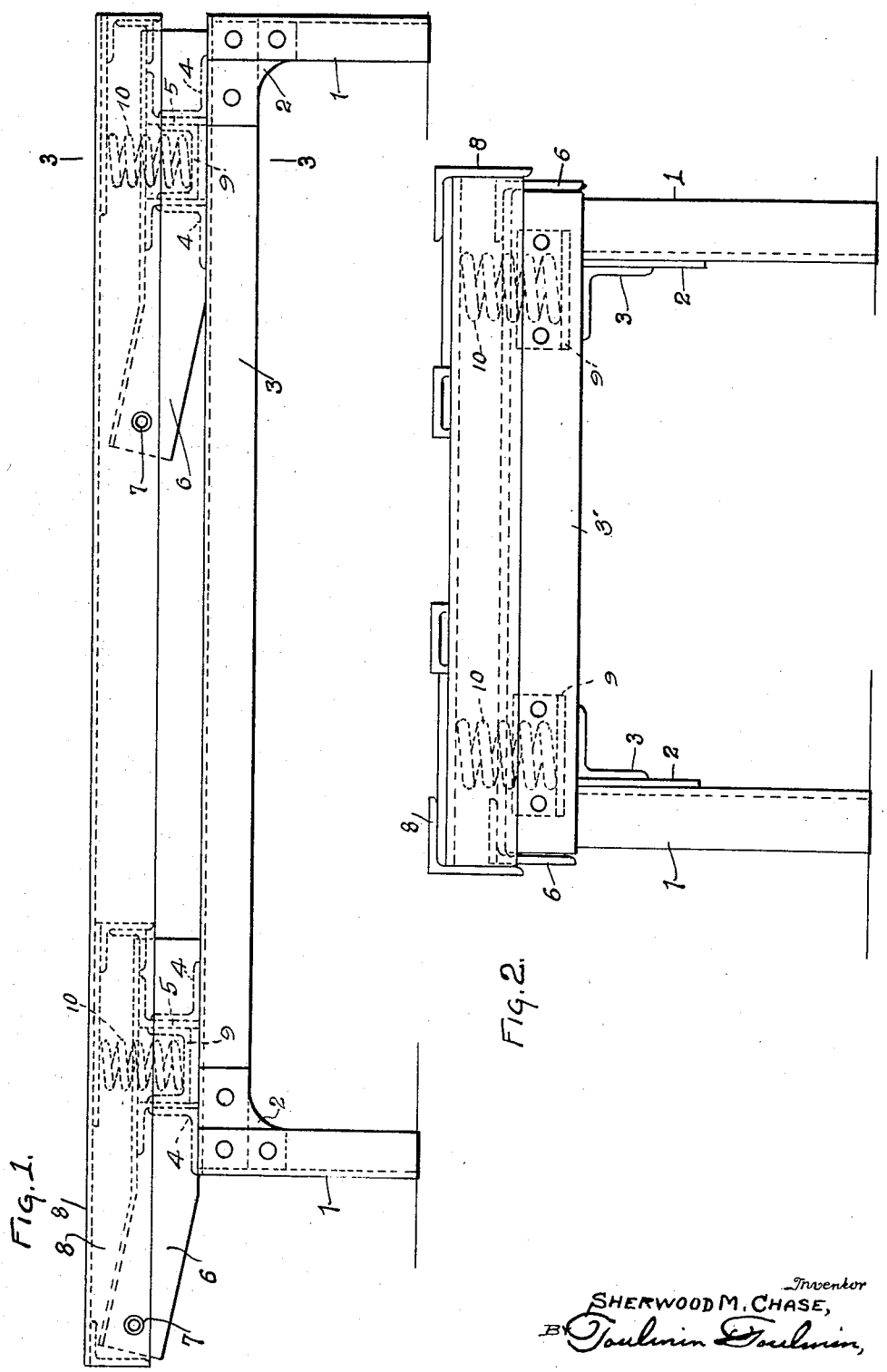

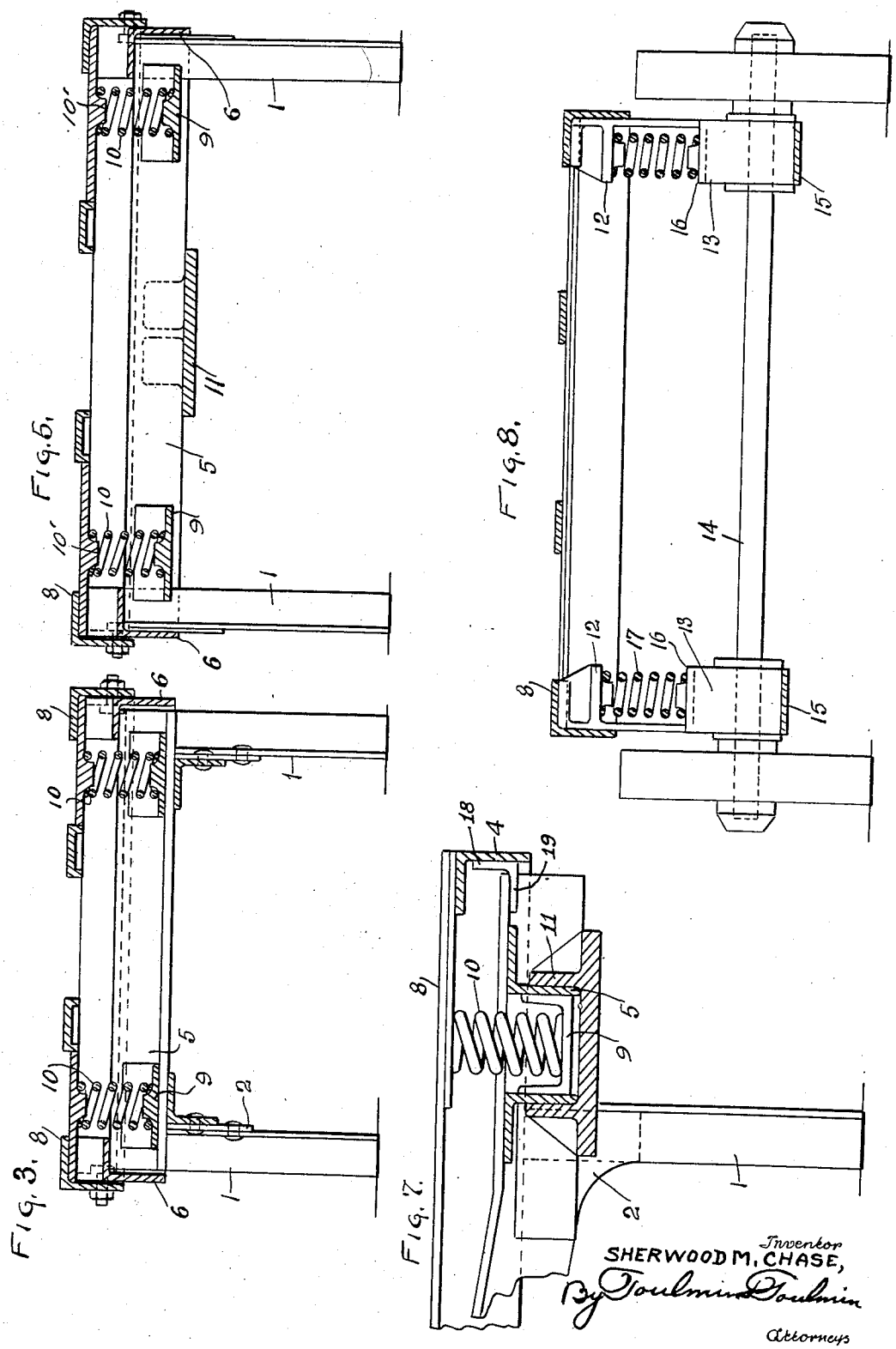

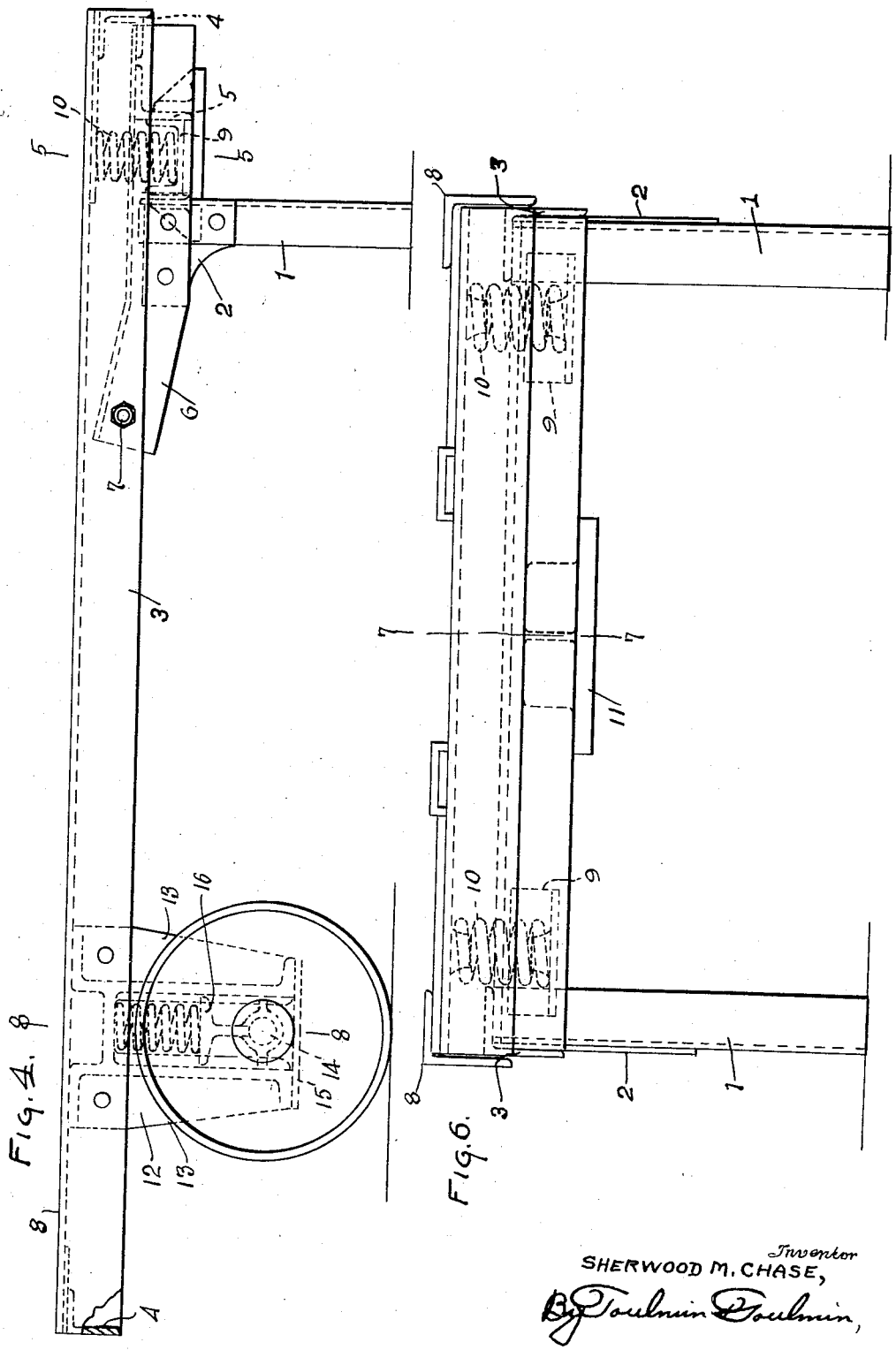

1,812,861

UNITED STATES PATENT OFFICE

SHERWOOD M. CHASE, OF COLUMBUS, OHIO, ASSIGNOR TO THE CHASE FOUNDRY & MANUFACTURING COMPANY, OF COLUMBUS, OHIO, A CORPORATION OF OHIO

SPRING SUPPORTED PLATFORM FOR VEHICLES

Application filed March 17, 1927. Serial No. 176,077.

My invention relates to vehicles and, in particular, to spring supported platforms for vehicles.

It is the object of my invention to provide a spring supported platform for a vehicle which may be detached from the vehicle, such as a lift truck, and, when so detached and lowered to the floor, it will stand upon its own supports, and delicate articles carried thereby, which, in the aggregate, may be of great weight and therefore difficult to handle, will not be injured.

It is a further object to provide such a spring supported platform which will have a portion thereof supported by a permanent running gear and another portion thereof by a running gear, which, when detached, will leave the platform in proper spring supported positions.

In the accompanying drawings:

Figure 1 is a side elevation of the spring supported platform without any running gear for a lift truck;

Figure 2 is a front elevation thereof;

Figure 3 is a section on the line 3—3 of Figure 1 looking in the direction of the arrows;

Figure 4 is a side elevation of a spring supported platform having a running gear at one end and a supporting standard at the other;

Figure 5 is a section on the line 5—5 of Figure 4;

Figure 6 is an end elevation of Figure 4 from the end mounted on standards;

Figure 7 is a section on the line 7—7 of Figure 6;

Figure 8 is a section on the line 8—8 of Figure 4.

Referring to the Figures 1, 2, and 3 in detail, 1—1 are vertical standards connected by angle plates 2 to side frame members 3 and cross frame members 3' providing a supporting frame.

Arranged transversely of this frame at either end thereof are angle irons 4 between which are located in engagement therewith a pair of spaced angle irons 5 which are connected at either end to the swinging arms 6 pivoted at 7 to the platform frame 8. These two angle irons 5 carry between them at each end thereof a U-shaped support 9 which supports one end of a helical spring 10, the other end of which is in engagement with a projection 10' on the under side of the frame 8 of the platform.

Thus, the engagement of the transverse members 5 with platform frame 8 prevents fore and aft shifting of the platform 8 with respect to the stationary platform having side frame members 3, while vertical movement is provided for the platform 8 on the springs 10.

In Figures 4, 5 and 6, it will be observed that the construction of the front end is precisely the same as that in Figures 1, 2 and 3, save that the stationary frame having spaced angle irons 5 is provided with a depending transversely-disposed bearing plate 11 on said angle irons, which is adapted to engage with a platform or other lift part of a small lift truck, which is run under the forward end of this equipment between the standards or legs.

The spring arm 6 sometimes referred to as a floating spring bolster, the springs 10 and the remaining members are the same. The only addition to the front end is the plate 11 which may be extended backwardly, as shown in the drawings, to a point where it connects on either side of the transverse members 5.

Turning to the rear end of the construction shown in Figure 4, it will be noted that the side frame members of the platform 8 carry depending, inverted, U-shaped brackets 12 having arms 13 passing on either side of the rear axle 14 and joined together at the bottom below the axle by the transverse plates 15. The axle carries a bolster 16 which supports the helical spring 17 between the bolster 16 and the frame 8.

It has been found in the operation of lift trucks that, when the platform upon which the articles are mounted, is lowered, that it is impossible to lower such platform to the floor or ground gently so that many articles which are heavy but fragile, such as those made of pottery, and the like, are broken when the truck descends towards the ground, and the frame is lowered in engagement with the ground or floor.

My unitary construction of a permanent supporting frame consisting of parts 1, 2, 3 and 3' pivotally and yieldingly connected as well as slidingly connected to the supplementary support platform 8 provides a solution of this difficulty. Legs can be provided for the platform composed of the members 2, 3 and 3' at both ends or at one end only, as will be seen in the respective Figures 1 and 4. To limit the upward movement of the member 8 there is provided on the ends of the frame channel iron members 18 which have extending therefrom horizontal flanges 19 for engaging parts of the arms 6.

It will be understood that I desire to comprehend within my invention such modifications as may be necessary to adapt it to varying conditions and uses.

Having thus fully described my invention, what I claim as new and desire to secure by Letters Patent, is:—

1. In combination, a detachable supporting platform, standards to support said platform on the ground, a load supporting platform, arms to pivotally connect said platforms to one another, means to support the free end of said arms with respect to the first mentioned platform, and yielding means interposed between the free end of said arms and the load supporting platform whereby the load supporting platform may move substantially vertically and yieldingly with respect to the platform which is supported directly on the ground.

2. In combination, a ground supported platform having ground engaging standards, means thereon for engaging with a lift truck for elevating said platform from the ground with its standards, and yielding means on said platform adapted to support a load supporting platform, and a load supporting platform.

3. In combination, a ground frame having supporting means to support it on the ground above the level of the ground, transverse guiding means mounted thereon in spaced pairs, spring supporting bolsters arranged therebetween springs mounted on said bolster, arms connected at one end to said bolsters, means pivotally connecting the other end of said arms to a load supporting frame resting on the upper ends of said springs.

4. In combination, a supporting platform, pairs of spaced transversely arranged angle irons on said platform, a support at each end of and between said angle irons, a load supporting platform supported by said supporting platform, springs between said platforms, one end of each of said springs resting on one of said supports and the other end of each of said springs engaging said load supporting platform, arms pivoted at one end to said load supporting platform, and means on the other ends of said arms to engage said angle irons to prevent the longitudinal movement of the load supporting platform on the supporting platform.

5. In combination, a supporting platform, pairs of spaced angle irons on said platform, a load supporting platform supported by springs on said supporting platform, swinging arms pivoted at one of their ends to said load supporting platform, a pair of spaced angle irons connected to the other ends of said arms and fitting between one of the first named pairs of angle irons, whereby the load supporting platform may have vertical movement but not longitudinal movement in relation to the supporting platform.

In testimony whereof, I affix my signature.
SHERWOOD M. CHASE.